March 25, 1952  A. A. BERNARD  2,590,084
SHIELDED ARC WELDING METHOD AND GAS CONFINING MEANS
Filed Aug. 6, 1945  4 Sheets-Sheet 1
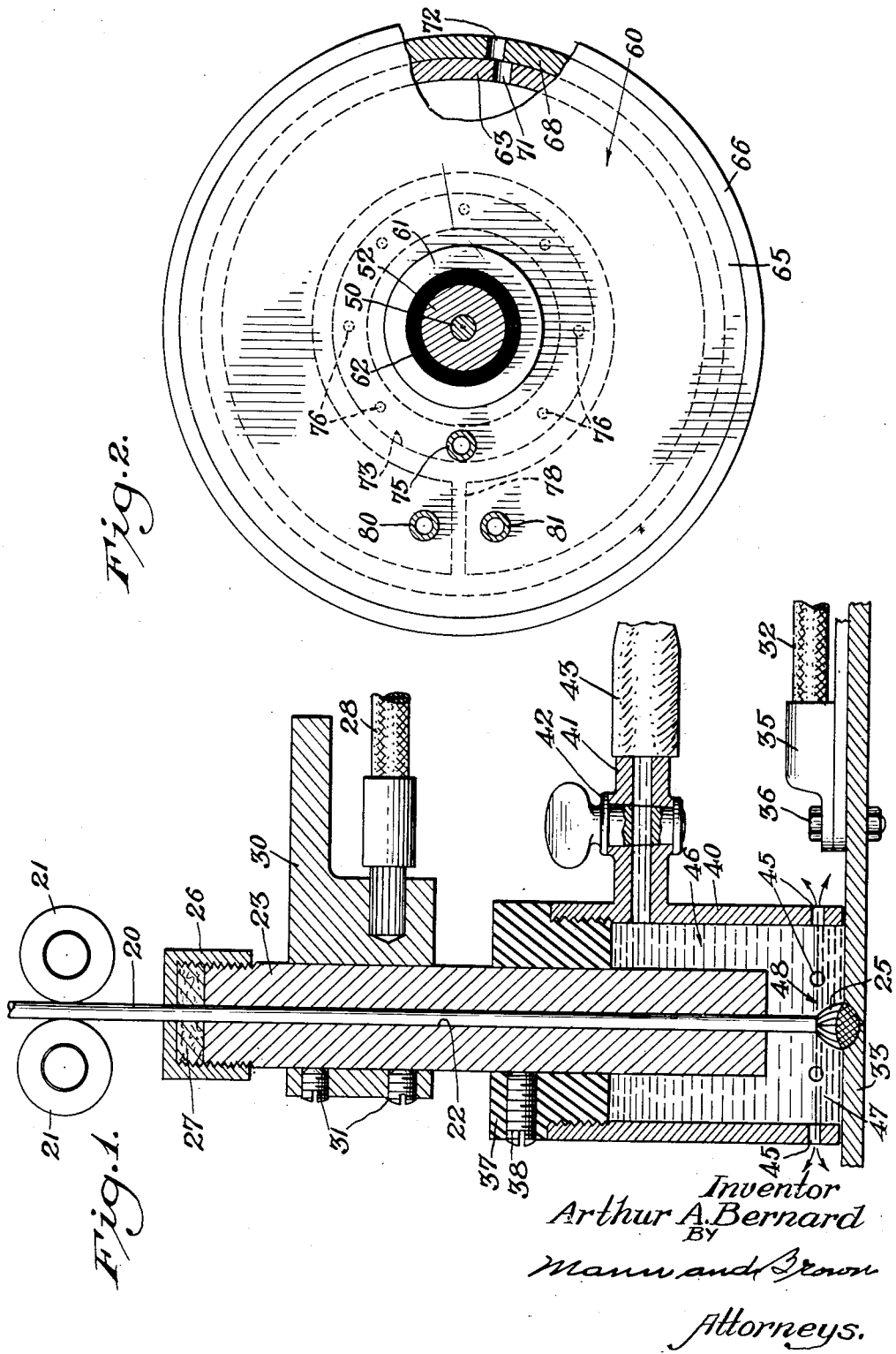
Inventor
Arthur A. Bernard
BY
Mann and Brown
Attorneys.

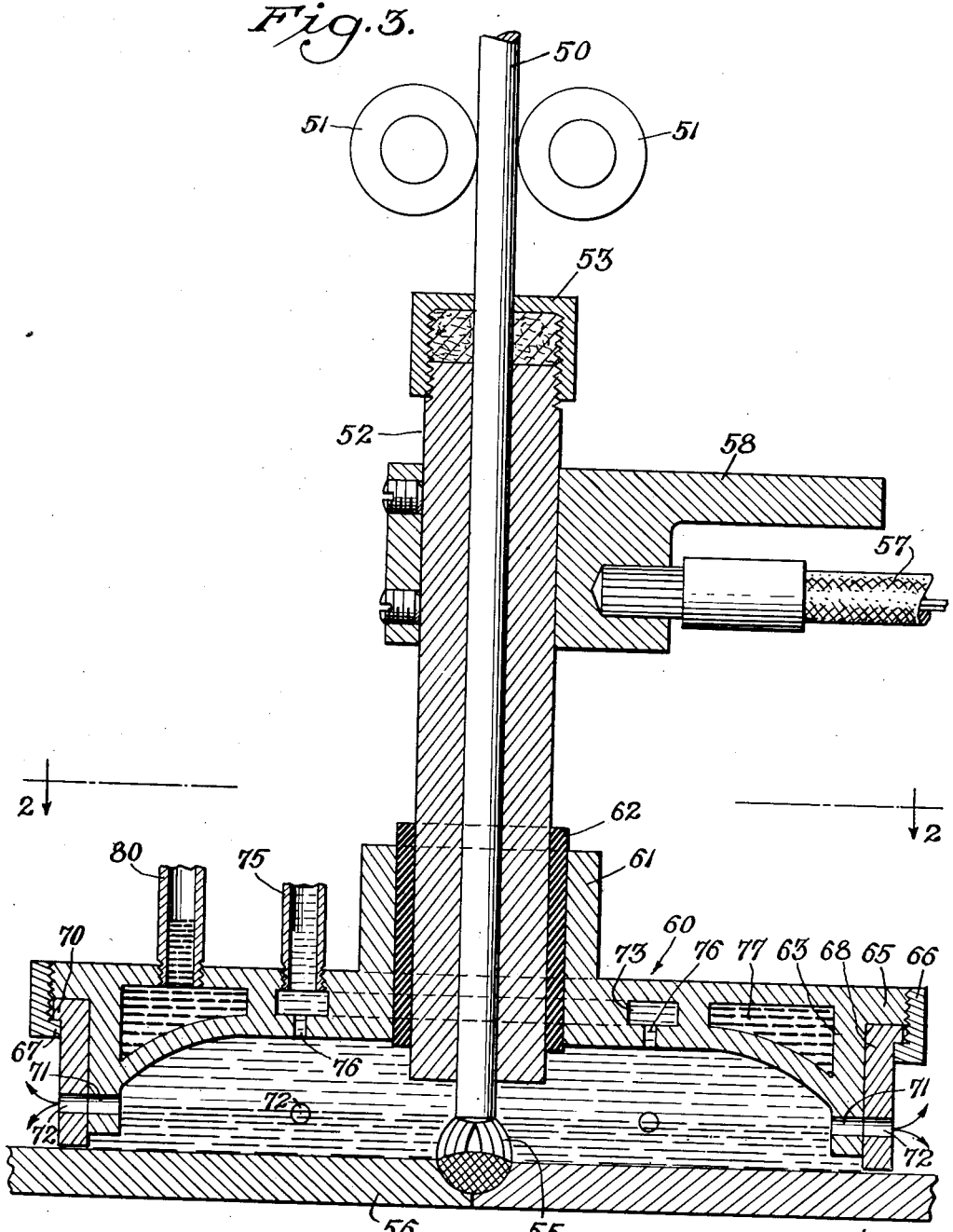

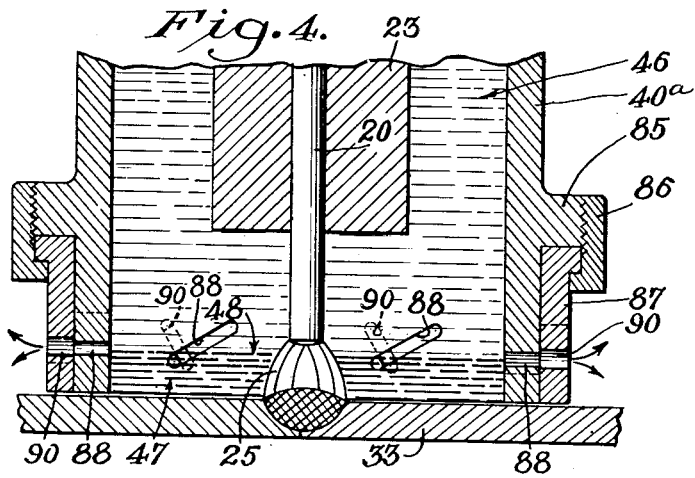
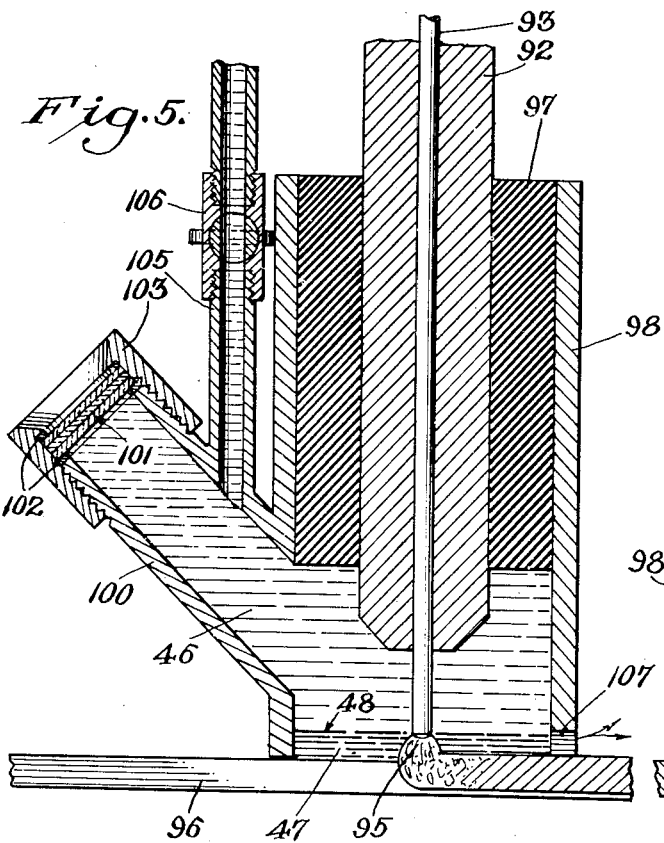
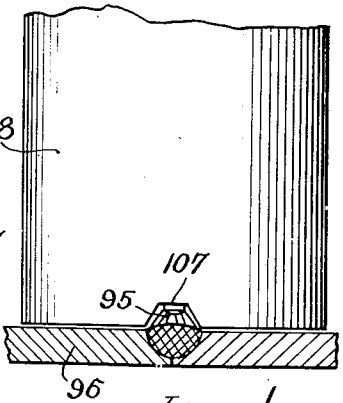

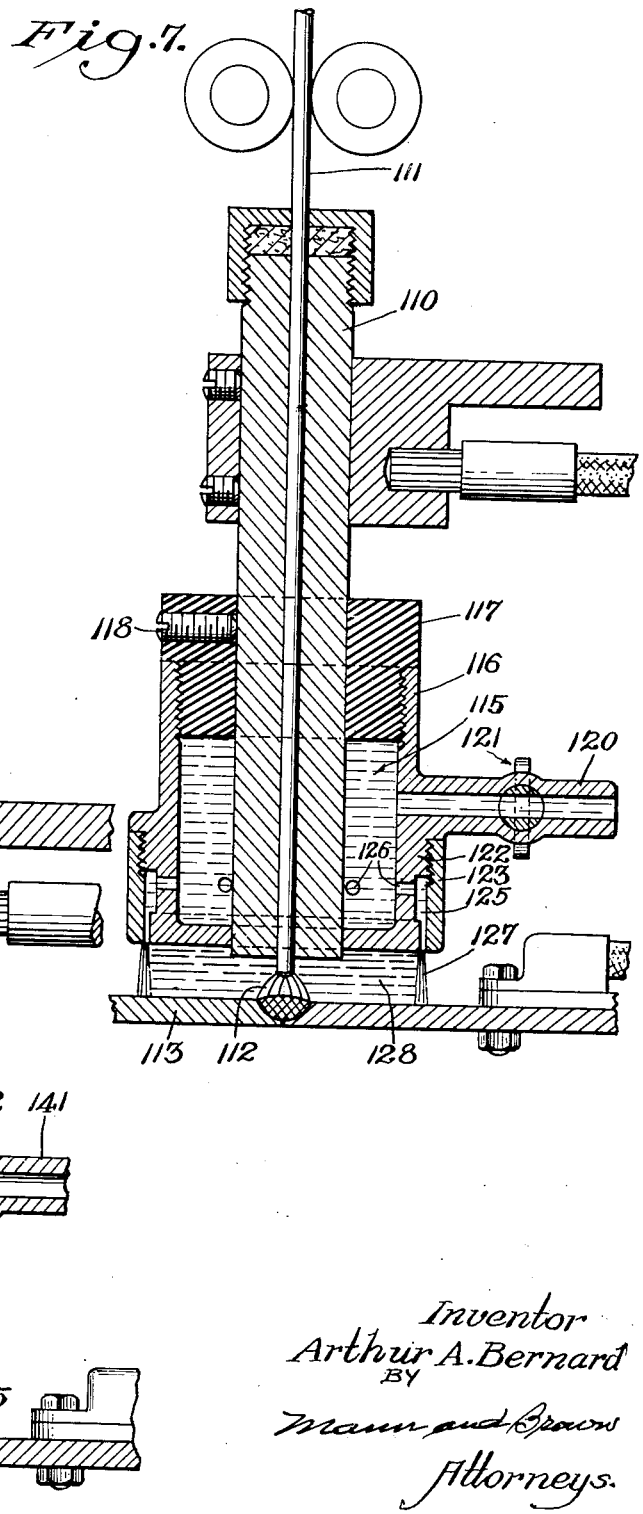

Patented Mar. 25, 1952

2,590,084

UNITED STATES PATENT OFFICE 2,590,084

SHIELDED ARC WELDING METHOD AND GAS CONFINING MEANS

Arthur A. Bernard, Chicago, Ill., assignor to National Cylinder Gas Company, a corporation of Delaware Application August 6, 1945, Serial No. 609,090

3 Claims. (Cl. 219—10)

My invention relates to electric welding, and is directed to a welding process as well as an apparatus for carrying out the process, wherein gas-shielding is employed to protect welding accomplished with an arc.

The necessity for shielding the work zone from the atmosphere in electric arc welding has been met for the most part by the use of flux either as a heavy flux coating on welding rod or as applied in mass to the work. The use of heavily coated rod has many disadvantages, especially in automatic welding, where the difficulty is encountered of conducting welding current through the non-conducting flux coating on an electrode as the electrode is unwound from a reel. Likewise it is not advantageous to use flux in bulk because the flux conceals the welding zone, and especially because of the task of applying and removing the mass of flux.

The need for a more satisfactory shielding procedure has been long recognized, and one of the earliest suggestions was to use a gas for a shielding function. The ideal would be the employment of a bare welding rod as an arc-sustaining electrode in combination with means for enveloping the welding zone in a suitable protective gas. It is to be emphasized that the welding rod should function as an electrode to cooperate directly with the base metal in maintaining an arc for the transfer of metal from the electrode to the base metal by means of the arc stream. In other words, an electrode-consuming, metal-conveying arc is sought. This ideal is in contrast to arrangements in which no metal is derived from an arc electrode, the arc functioning not as a transferring or conveying medium but merely as a heating medium for causing metal to be melted from welding rod in proximity to the arc.

One expedient for shielding electric welding with gas, disclosed more than twenty years ago, is to perform the welding operation in the open air while a stream of shielding gas is directed toward the welding zone by a nozzle positioned to one side of the arc. To my knowledge this expedient has not been practiced commercially.

Another procedure is known as helium arc welding in which an arc is maintained between an infusible electrode and a base metal with an annular stream of helium directed concentrically of the electrode. In this procedure the arc serves solely as a heating medium, not as a metal-transferring stream, and when additional weld metal is required suitable welding rod is positioned in proximity to the helium-shrouded arc for melting. This welding process is practiced to a very limited extent.

Another gas-shielding procedure employed on a minor scale is atomic-hydrogen welding, wherein an arc is established between two infusible electrodes and hydrogen is supplied to the arc by two annular streams concentric to the two electrodes, respectively. Here again the arc functions strictly as a heating medium and any additional weld metal required must be supplied by bringing welding rod into close proximity to the arc.

Other gas-shielding procedures heretofore suggested in the art involve the use of chambers in some instances enclosing the whole base metal (see Hobart Patent No. 1,746,081), and in other instances enclosing only a surface portion of the base metal (exemplified by the Lincoln Patent No. 1,711,151). This use of shielding gases in confined spaces has not been practiced on any large scale.

It is a striking fact that notwithstanding extensive research in the use of gas for shielding arc welding, at present 95% of electric arc welding, is performed with flux-coated welding rod.

The general object of my invention is to provide an efficient gas-shielded welding process that permits employment of a bare electrode at one end of an electric arc to supply weld metal to the work at the other end of the arc. It is my purpose to obtain a gas-shielded arc of "normal" character in the sense of having the metal-transferring capability and the crater-forming capability characteristic of arcs formed by conventional flux-coated electrode. The attainment of this general object is based on certain underlying concepts including the following:

1. From my experiments I have reason to believe that progress in the gas-shielding of arc welding has been retarded in large part by failure to isolate the electric arc, or at least a major portion of the electrice arc, from the shielding gas. If the arc is unduly exposed to the shielding gases the capability of the arc to deposit metal satisfactorily to a base metal at one end of the arc from a fusible electrode at the other end of the arc is destroyed, and the only function the arc can perform is that of supplying heat for melting welding rod apart from the arc. It is well known that superior results in arc welding requiring the application of weld metal can be achieved only by the deposition of the additional weld metal by the arc stream, per se. In both helium arc welding and atomic-hydrogen welding, mentioned above, the arc is unfortunately in intimate contact with the shielding gas, and in the prior art procedures mentioned wherein shielding gas is introduced into an enclosed welding zone there has been no attempt to control the intermixing of the shielding gas with the arc stream.

2. The gaseous product of arc action may be employed successfully to shield the welding operation. The constituents of such gaseous product include gases freed by the heating of the metal at both ends of the arc, the vaporization of metal at both ends of the arc, the emission of electrons by the heated metal, ions, and the products of transitory chemical reactions. The composite gaseous product of the arc action may be conveniently termed arc-generated gas.

3. A supplemental gas may be used as a wall or at least a retarding barrier to enclose or co-operate in enclosing the arc-generated gas, thereby to cause the arc-generated gas to form a protecting blanket and protect such blanket from the atmosphere. A wall or barrier of supplemental gas differs from a solid wall in its high insulating efficiency both electrically and thermally. In fact the flowing supplemental gas may have a substantial cooling effect. It is an especially useful fact that a gas barrier is highly resilient.

4. The desired shielding blanket of arc-generated gas may be formed and maintained in a practical manner by enclosing the space around the arc to confine and protect the arc-generated gas, such enclosure being achieved at least in part by a stream of shielding gas with care to prevent the shielding gas from unduly contacting the arc stream. The atmosphere is excluded, and therefore this concept is at variance with the conclusion advanced by some researchers that oxygen is essential for the existence of a normal crater-forming arc. (See the article by G. E. Doan and R. E. Lorentz, Jr., in "The Welding Journal," 20 (2), Research Supplement, 103-s to 108-s—1941.) My experiments indicate that a normal arc cannot exist in a pure helium atmosphere, not because oxygen is absent but because the inert helium molecules dilute the arc stream and lower its efficiency.

5. The stream of shielding gas may be employed as a curtain surrounding the arc but out of contact with the arc, which curtain permits exit of the arc-generated gas but protects the blanket of arc-generated gas from the atmosphere.

6. In an alternative practice, exceptional economy may be achieved in the use of the shielding gas by employing a gas lighter than arc-generated gas, and by employing a chamber around the arc with suitably located and suitably restricted venting in such manner that the heavier arc vapor is formed in a shielding blanket separate and apart from the introduced gas, there being an interface between the two gas bodies at a level near or above the upper end of the welding arc. In such an arrangement the welding arc exists wholly, or nearly wholly, in the arc vapor blanket, and the added shielded gas serves as means to supplement the volume of the arc vapor and to cooperate in the confining or enclosing of the arc vapor.

7. The employment of a suitable gas to supplement the arc-generated gas without unduly vitiating the arc stream affords a wide latitude of adjustment heretofore not attained. Any attempt to enclose the welding zone as it is shifted along the base metal involves the problem of leakage from a traveling chamber having a fixed wall on one side. When the arc-generated gas is enclosed solely by solid walls the degree of clearance between the moving walls and the fixed surface of the base metal is critical, and only a minor variation in such clearance may seriously affect the weld quality. A moving shielding curtain of supplemental gas impinging on the base metal adapts itself to irregularities in the base metal surface and to variations in space relationships. There is nothing critical about the adjustment of such an arrangement. On the other hand, the use of the extraneous gas to supplement the volume of arc-generated gas in a moving chamber having solid walls makes both leakage and venting of the chamber less critical.

8. There may be some advantage, at present unidentified, in the use of helium to form a boundary for a blanket of arc-generated gas, since the helium forms an inert mass bounding a region of free electrons.

9. The modifying effect of a shielding gas on an arc stream that apparently has been the source of a great deal of trouble in arc welding, may be controlled and directed to the useful purpose of varying the rate of metal deposition by an arc. Thus by moving the boundary of the shielding gas in a controllable manner to variably encroach upon an electric arc, the rate of metal deposition by the arc may be correspondingly reduced. I have found that the voltage drop across the arc increases and the amperage decreases in accord with the degree of such encroachment, the wattage of the welding current remaining substantially constant. Thus a new control over the welding circuit is afforded.

The purpose of the disclosures made herein is to put the above concepts into practice.

More specific objects of the invention include the following: To provide efficient but structurally simple arrangements to employ supplemental gas to form a boundary for a shielding blanket of arc-generated gas; to provide, in some practices of the invention, a shield largely, if not entirely, comprising a curtain of gas that may be used in the open air with the welding zone substantially fully visible; to provide an efficient nozzle arrangement for so discharging a stream of gas around an electrode as to afford the desired protection against the atmosphere without vitiating the welding arc; to provide a welding chamber with a simple venting adjustment for varying the rate of gas release from the chamber; and to provide a traveling welding chamber with simple means for varying the level therein of the interface between a lower blanket of arc-generated gas and an upper body of lighter supplemental gas.

The above and further objects and advantages of the invention will be apparent from my detail description to follow, taken with the accompanying drawings.

In the drawings, which are to be regarded as merely illustrative:

Fig. 1 is a vertical sectional view through one embodiment of my invention for carrying out the welding process in a moving chamber;

Fig. 2 is a transverse sectional view of a second embodiment of the same general character, taken as indicated by the line 2—2 of Fig. 3;

Fig. 3 is a vertical sectional view of the second embodiment;

Fig. 4 is a fragmentary sectional view indicating how the structure shown in Fig. 1 may be modified;

Fig. 5 is a vertical sectional view of another embodiment of the same general character as Fig. 1;

Fig. 6 is a fragmentary elevation of the structure shown in Fig. 5;

Fig. 7 is a sectional view of an embodiment of the invention that provides a shielding curtain of supplemental gas to enclose the welding zone; and Fig. 8 is a similar view of another embodiment providing a shielding curtain in the form of a stream of supplemental gas.

Fig. 1 shows the novel parts of a welding apparatus that may be used for welding thin gauge sheet metal with small diameter welding rod at low current. Bare welding rod or electrode 20 passes between a pair of feed rolls 21 on a conventional automatic welding head (not shown), and passes through the axial bore 22 of a tubular electrode holder 23, the rate of feed being synchronized with the rate at which electrode is consumed by the metal transferring arc 25. The tubular holder 23 is made of efficient current-conducting metal, preferably copper. To prevent the upward escape of gases through the tubular electrode holder 23 the upper end of the holder may be provided with a packing gland 26 confining a ring of asbestos 27.

For the purpose of establishing the welding circuit an electric cable 28 is connected to an aperture terminal block 30 that is secured to the electric holder 23 by suitable set-screws 31, and a second electric cable 32 on the other side of the circuit attached to the base metal 33 by a suitable cable terminal 35 and bolt 36.

To provide the desired traveling chamber for enclosing the welding zone, the electrode holder 23 is embraced at an intermediate level by a suitable bushing 37 adjustably anchored by a a set-screw 38. Threaded or otherwise mounted on the bushing 37 is a cylindrical chamber wall 40, which, as indicated in the drawings, is carried over the surface of the base metal 33 with relatively close clearance. The means for introducing shielding or supplemental gas into the chamber thus formed may comprise a nipple 41 integral with the cylindrical wall 40, the nipple being provided with an adjustable gas valve 42 and being connected to a gas supply hose 43.

For relatively low currents the cylindrical chamber wall 40 may be metal, with the bushing 37 made of suitable insulating material. For high welding currents, however, the chamber may be made entirely of a suitable ceramic.

The gas supplied through the hose 43 is, in this particular practice of the invention, any suitable gas substantially lighter than the gas generated by the arc. Either a suitable combustible gas, such as hydrogen, or an inert gas may be used. Helium is a useful gas for the purpose. Since the gas generated by the arc 25 is substantially heavier than the shielding gas introduced from above, the two gases will remain bodily separated, providing the chamber is vented at an intermediate level and provided the supplemental gas is not introduced in such manner as to cause undue turbulence at the venting level.

In the construction shown in Fig. 1 a plurality of circumferentially spaced vent apertures 45 are provided in the cylindrical chamber wall 40 at appoximately the level of the lower end of the electrode 20; that is to say, at approximately the level of the upper end of the arc 25. Thus the gas content of the chamber consists of an upper body 46 of introduced gas and a lower body or blanket 47 of arc-generated gas, the two bodies forming an interface 48 at the level of the vent apertures 45. Gases from the two bodies 46 and 47 escape jointly through the vent apertures 45, as indicated by the arrows in Fig. 1.

In operating the apparatus shown in Fig. 1, the valve 42 is opened to introduce the supplemental gas and subsequently the arc is established. It is important, of course, that the rate of feed of the supplemental gas be sufficiently low to be handled by the vent apertures 45, and, on the other hand, be sufficiently high to maintain the chamber pressure at least slightly above atmospheric to prevent the ingress of air. I have found that a slight pressure above atmospheric is desirable, but that unduly high pressure in the chamber causes the cross-sectional area of the arc to increase with consequent lowering of the current density.

In general the size or total capacity of the vent apertures 45 required is determined primarily by the magnitude of welding current. In one practice an apparatus such as shown in Fig. 1 for welding No. 303 18-gauge stainless steel with a $\frac{3}{32}$ inch diameter electrode at 110 amperes was provided with six vent apertures $\frac{1}{16}$ inch in diameter. Helium was supplied above atmospheric pressure at a rate equivalent to from 1 to 1½ liters per minute at atmospheric pressure. With such an arrangement and such adjustment a high quality weld is obtained, and without change in adjustment the welding amperage can be varied freely between 95 amperes and 125 amperes without affecting the quality of the weld.

With reference to the rate of feed of the supplemental gas, the rate of venting and the amperage of current, which amperage controls the rate of gas generation, it is to be noted that the chamber is substantially larger than the volume of arc-generated gas therein, the large volume being occupied, in major part, by the supplemental gas. It will be noted further that the rate of escape of gas through the vent apertures 45 will vary with the pressure in the chamber, which pressure in turn varies with the combined rates of gas introduction and gas generation. The fact that the operation of the apparatus is not critical is explained in part by the ample volume of the chamber with sufficient supplemental gas for that volume, and in part by the automatic partial compensation for variations in the rates of gas supply and gas generation by similar variations in the rate of gas release through the vent apertures 45. It has been found, moreover, that the apparatus permits liberal variation in the clearance between the lower end of the circular wall and the surface of the base metal, so that unevenness and variations in the surface of the base metal do not affect the quality of the weld. The interface 48 between the upper body of helium and the lower body of arc-generated gas varies in level, and perhaps in configuration, in automatic adjustment to such changes of factors without interfering with the efficiency of the welding arc.

Figs. 2 and 3 show how such an apparatus may be constructed for welding heavier material with heavier welding rod and higher welding current. The heavier electrode 50 is fed by the usual rolls 51 into a tubular electrode holder 52 through a suitable packing gland 53 to sustain an arc 55 above the work or base metal 56. The welding circuit includes the usual cable 57, connected to the holder 52 by a terminal block 58.

At the lower end of the electrode holder 52 is a housing 60, having a cylindrical neck 61 by means of which the housing may be mounted on the electrode holder with an interposed sleeve 62 of suitable insulating material, such as asbestos.

The housing 60 is formed with what may be called an inner circumferential wall 63 and an overhanging circular flange 65. In the particular construction shown the overhanging flange 65 is threaded for engagement by a bushing 66, having an inwardly presented flange 67. The bushing 66 serves to retain in a rotatably adjustable manner an outer circumferential wall 68 in the form of a cylindrical ring having an outwardly presented flange 70.

An important advantage of the described construction is that it permits ready variation in the capacity of the venting apertures at the discretion of the operator. To this end the inner cylindrical wall 63 is provided with a series of spaced bores 71, and the outer circumferential wall 68 is provided with a corresponding series of bores 72, so that the outer circumferential wall may be adjusted to cause the bores 71 and 72 to overlap to various degrees. Fig. 2 shows, by way of example, two bores 71 and 72 partially overlapping for permitting an intermediate rate of vent flow to the atmosphere.

The supplemental gas may be introduced into the chamber formed by the housing 60 in any suitable manner that avoids undue turbulence at the level of the vent bores. In the particular construction shown, supplemental gas from a suitable supply hose (not shown) enters an annular passage 73 in the upper wall of the housing through a nipple 75, and is discharged downwardly from the passage through a series of spaced ports 76. Preferably the housing 60 is water cooled, and, for such purpose, is formed with a water passage 77 of circular configuration, the two ends of the passage being separated by a wall 78. Cooling water from a suitable source (not shown) is introduced into one end of the water passage 77 through an inflow nipple 80 and flows out through a second nipple 81.

The operation of the apparatus shown in Figs. 2 and 3 may be readily understood from the previous discussion of Fig. 1.

The purpose of Fig. 4 is to indicate how the construction shown in Fig. 1 may be modified to vary the level of the interface 48 that is formed by the upper body 46 of supplemental gas and the lower body 47 of arc-generated gas. The construction is largely similar to Fig. 1, as indicated by the use of corresponding numerals to represent corresponding parts.

The cylindrical wall 40ª in Fig. 4 is formed with a radial flange 85 that is threaded for engagement by a suitable bushing 86. The bushing 86 is inwardly flanged to support in a rotatably adjustable manner a cylindrical member 87. Thus the lower portion of the cylindrical wall 40ª constitutes what may be termed an inner circumferential wall and the cylindrical member 87 constitutes a relatively rotatable outer circumferential wall.

It is contemplated that the two circumferential walls in Fig. 4 will be provided with pairs of intersecting slots, one slot of each pair being in each of the circumferential walls; and it is further contemplated that at least one of each pair of slots will be inclined so that relative rotation of the two circumferential walls will vary the level of slot intersection. This presupposes, of course, that the other slot will be other than horizontal. In other words, it, too, will be inclined with respect to a horizontal plane, and may even be vertically disposed but should not be parallel with the cooperating slot in the other member. Thus Fig. 4 shows a series of inclined slots 88 in the inner circumferential wall, and a second series of corresponding but oppositely inclined slots 90 in the outer circumferential wall. Obviously the bushing 86 may be loosened to permit rotational adjustment of the cylindrical member 87 for raising or lowering the level of the vent apertures provided by the intersection of the slots 88 and 90. Thus the interface 48 may be varied in level at will to cause the upper body 46 of supplemental gas to encroach to various degrees on the arc 25.

As heretofore explained, the controlled encroachment of the supplemental gas on the arc causes the arc stream to be diluted with the supplemental gas to a controlled degree, with consequent reduction in the amperage of current flow across the arc, and, therefore, corresponding reduction in the rate of metal transfer by the arc. This is in accordance with the theory that the amount of current carried by the arc is proportional to the quantity of ionized gas present in the arc. According to this theory the more ions that are present in the arc the greater will be the current transferred, and, conversely, the fewer the ions the smaller the current. Since the supplemental gas used in the instant invention is relatively inert the quantity of ions which will be present in such supplemental gas is very small, with the result that the more the arc stream is diluted by such supplemental gas the fewer will be the ions that are present to carry the arc current, with the result that a lower arc current will ensue.

Fig. 5 shows another embodiment of the invention in which, as heretofore described, a body of supplemental gas 46 is maintained in a confined space above a lower body or blanket of arc-generated gas 47 with an interface 48 between the two bodies. Fig. 5 shows the usual tubular electrode holder 92, through which extends a bare electrode 93 for maintaining an arc 95 extending downward to the base metal 96. The electrode holder is surrounded by a thick insulating bushing 97 which supports a metal cylinder 98 forming a substantially closed chamber on the surface of the base metal. Branching from the cylinder 98 is a viewing tube 100, the outer end of which is closed by a plurality of lenses 101 at least one of which is colored. The plurality of lenses is held between two rings 102 of suitable material by means of an eye-piece 103 that is threaded onto the outer end of the viewing tube.

Supplemental gas from a suitable source (not shown) is fed into the metal cylinder 98 from above, preferably through a feed line 105 connected with the viewing tube, as shown, the feed line being equipped with a suitable control valve 106. The only exit for the gas content of the chamber formed by the metal cylinder 98 is the clearance space between the lower rim of the cylinder and the base metal 96, together with a notch 107 that is cut in the lower rim on the trailing side of the traveling chamber to clear the formed weld. The notch 107 extends upward to approximately the level of the upper end of the arc 95 and is dimensioned to sufficiently restrict outward flow to exclude atmosphere from the interior of the chamber.

The provision of the viewing tube 100 makes it possible for the operator to observe the welding operation carefully, and, if desired, the welding operation may also be viewed at a low angle through the notch 107.

In each of the various forms of traveling chamber shown in Figs. 1 to 6, the melted metal in the welding region inside the chamber is effectively shielded and the arc is completely isolated from the atmosphere. The arc in all respects is normal in the sense of corresponding to a highly efficient arc produced in the conventional manner by the use of an electrode having a heavy flux coating. Thus the temperature of the arc is normal at both the electrode terminal and the base metal terminal and the arc causes the formation of a crater in the base metal of normal area and depth. The process produces a weld bead having a very fine rippled surface indicating that the arc stream conveys the weld metal from the electrode in globules of unusually small size. The weld deposits are dense, unusually fine grained, and completely free of porosity. The process is applicable to the use of electrodes covering the complete range of sizes from $\frac{1}{16}''$ diameter to $\frac{5}{16}''$ diameter employed in other welding methods.

The purpose of Figs. 7 and 8 is to indicate how the supplemental gas may be utilized in the form of a curtain instead of a confined body, the curtain of gas serving as means for the enclosure of the welding zone and being, of course, out of contact with the arc.

Fig. 7 shows the usual tubular electrode holder 110 through which extends a bare electrode 111 to establish an arc 112 with the base metal 113. Surrounding the lower end of the electrode holder 110 is an annular chamber 115 formed by a cup-shaped member 116 and an upper bushing 117 threaded thereto, the bushing being retained on the electrode holder by a suitable set-screw 118. Extending laterally from the cup-shaped member 116 is a feed line 120 for the shielding gas, the feed line being equipped with a suitable control valve 121.

Below the feed line 120 the cup-shaped member 116 has a circumferential flange 122 that is threaded to receive a cylindrical member 123. The cylindrical member 123 defines with the cup-shaped member 116 an annular nozzle passage 125, the lower discharge end of the nozzle passage being suitably restricted, as shown.

Gas from the feed line 120 enters the annular chamber 115 with a desirable cooling effect on the electrode holder 110 and flows out of the annular chamber 115 into the outer nozzle passage 125 through a series of circumferentially spaced bores 126 in the cup-shaped member 116. From the nozzle passage 115 the gas is discharged in the form of an annular jet or continuous cylindrical curtain 127. It is apparent that the cylindrical curtain of gas 127, in combination with the metal structure on the lower end of the electrode holder and in combination with the base metal 113, forms a traveling chamber or enclosure for the welding zone. It is to be noted that the gas curtain is spaced radially from the arc 112 by sufficient distance to preclude contact between the gas curtain and the arc.

The gaseous product generated by the arc action forms a body 129 that blankets the base metal in the welding zone. The arc-generated gas, of course, must have an outlet but finds ready exit through the cylindrical curtain of gas 127. Thus, the gas curtain permits continual radial discharge of the arc-generated gas and yet shields the inner blanket 129 of the arc-generated gas from the atmosphere. It is important to note, moreover, that the cylindrical curtain 127 forms a complete enclosure at all times, the gas curtain being effective regardless of any unevenness or changes in the surface of the base metal.

In the construction shown in Fig. 8, the bare electrode 130 is fed in the usual manner into an electrode holder 131 for the formation of an arc 132 with the base metal 133. The purpose of this particular form of the invention is to provide a gas curtain 135 that is conical in configuration, the curtain diverging outwardly away from the arc 132. Any suitable construction may be employed to produce such a curtain.

In the particular construction shown in Fig. 8, the electrode holder 131 is reduced in diameter at its lower end to form the inner wall of an annular gas chamber 136. The lower end of the electrode holder 131 is further reduced to receive a spray bushing 137 of conical or flaring configuration. The outer wall of the annular chamber 136 is formed by a cylinder 138 that is threaded onto the electrode holder in the manner shown, the lower end of the cylinder being tapered from the inside to cooperate with the bushing 137 in forming a diverging or conical spray passage 140. The shielding gas is fed into the upper end of the annular gas chamber 136 from a feed line 141 controlled by a valve 142.

It is apparent that in the mode of operation exemplified by Figs. 7 and 8, the specific gravity of the gas that forms the shielding curtain need not be less than the specific gravity of the arc-generated gas. In fact a relatively heavy gas may be readily employed especially when the shielding gas is directed radially away from the arc in the manner exemplified by Fig. 8.

The disclosure herein in detail of specific forms of my invention by way of example will suggest to those skilled in the art various changes and substitutions under my basic concepts, and I reserve the right to all such departures that properly lie within the scope of my appended claims.

I claim as my invention:

1. In the art of electric arc welding wherein an arc is established between a base metal and an electrode above the base metal, the improvement that consists in enclosing a space around the arc to confine the arc-generated gas, continually introducing into said space at a level above the lower end of said arc a gaseous fluid lighter than said arc-generated gas, continually venting said space at a level above the lower end of said arc, correlating the introduction of said gaseous fluid and said venting to cause said arc-generated gas and said gaseous fluid to form separate bodies with an interface at substantially said level, and varying said venting level to shift said interface along the arc thereby to vary the rate of metal deposition from the electrode through the arc.

2. In an apparatus for arc welding a base metal, a metal-depositing electrode extending downward to form an arc, means forming a chamber enclosing a space around the arc, means to introduce into said chamber above the arc a gaseous fluid substantially lighter than the gas generated by the arc, means to control the rate of introduction of said gaseous fluid, means to release the fluid content of the chamber at a level relatively close to the level of the upper end of the arc, and means to vary the rate of said release to maintain the interior of the chamber above atmospheric pressure to prevent ingress of the atmosphere, said means being adjustable to permit correlation of the rates of introduction of said gaseous fluid and of said release to maintain the arc-generated gas substantially wholly below the release level and the introduced gaseous fluid substantially wholly above the release level without undue turbulence at said level.

3. In the art of electric arc welding wherein an arc is established between a base metal and an electrode above the base metal, the improvement that consists in enclosing a space around the arc to confine radially the arc-generated gas as a shielding blanket over the surface of the base metal in the region of the arc, introducing a shielding gas into an upper part of said space so enclosed, venting said space at about the level of the electrode end of said arc, and correlating the venting of said space and the rate of introduction of said shielding gas to maintain the gaseous content of said space above atmospheric pressure substantially to prevent ingress of the atmosphere and to restrict the outflow of said arc-generated gas sufficiently to maintain said blanket of said arc-generated gas.

ARTHUR A. BERNARD.

REFERENCES CITED

The following references are of record in the file of this patent:

UNITED STATES PATENTS

| Number | Name | Date |
| --- | --- | --- |
| 1,309,696 | Roberts et al. | July 15, 1919 |
| 1,746,207 | Alexander | Feb. 4, 1930 |
| 1,749,765 | Hendrickson | Mar. 11, 1930 |
| 2,053,417 | Brace | Sept. 8, 1936 |

OTHER REFERENCES

Doan et al.: "Metal Deposition in Electric Arc Welding," "Welding Journal," September 1932, pages 31–33.

Welding Handbook, 1942, pages 128–130, American Welding Society, 33 W. 39th St., New York, N. Y.